United States Patent [19]

Olsen

[11] 4,050,495
[45] Sept. 27, 1977

[54] REMOVABLE TREAD BELT

[75] Inventor: Richard J. Olsen, Massillon, Ohio

[73] Assignee: The Goodyear Tire & Rubber Company, Akron, Ohio

[21] Appl. No.: 646,432

[22] Filed: Jan. 5, 1976

[51] Int. Cl.² ............................................. B60C 11/00
[52] U.S. Cl. ................................ 152/187; 152/361 R; 305/19
[58] Field of Search ............... 305/19, 35 EB, 38, 11, 305/13, 34, 54; 152/175, 176, 187, 188, 193, 194, 198, 199, 190, 191, 185, 209 WT, 361 R

[56] References Cited

U.S. PATENT DOCUMENTS

| | | | |
|---|---|---|---|
| 1,923,661 | 8/1933 | Carey | 152/199 |
| 3,897,814 | 8/1975 | Grawey | 152/175 X |
| 3,899,220 | 8/1975 | Grawey et al. | 305/19 |

Primary Examiner—Robert B. Reeves
Assistant Examiner—John P. Shannon
Attorney, Agent, or Firm—F. W. Brunner; R. P. Yaist

[57] ABSTRACT

A removable tread installed as an annular belt about the circumference of a tire carcass. The inner surface of the removable tread belt and the outer surface of the tire carcass have an interengaging pattern to interlock the two. The removable tread belt has a plurality of axially oriented metal bars and an inextensible circumferential belt radially outwardly of the bars. The bars and the inextensible belt are encapsulated in a matrix of rubber. The ends of the bars extend outwardly to a point beyond the widest portion of the tire carcass sidewall. The tread belt has a tread pattern on its outer circumferential surface.

17 Claims, 4 Drawing Figures

REMOVABLE TREAD BELT

BACKGROUND OF THE INVENTION

This invention relates generally to a removable tread belt for tires, and more particularly to such for use in tires for heavy equipment such as earthmovers and the like.

Removable tread belts have been used in automotive, truck and aircraft tires. They offer the advantages of allowing a tire carcass to be reused when the tread becomes worn, rather than be discarded. They also allow the same tire carcass to be equipped with various types of treads. This concept would seem also to have promise for use in tires used for heavy equipment, such as off-road construction machinery, but such tires able to withstand the brutal conditions to which off-road tires are subjected appear not to be present in the prior art. As an example, off-road tires such as this can have a rim diameter of fifty inches and a rim width of twenty five inches.

SUMMARY OF THE INVENTION

It is an object of this invention to provide a removable tread belt that is particularly well suited for use in off-road equipment.

Another object of this invention is to provide a removable tread belt that provides a large ground contacting area.

Another object of this invention is to provide a removable tread belt that offers protection to the side wall of the tire carcass.

Another object of this invention is to provide a removable tread belt that requires less mass in the tire carcass.

Another object of this invention is to provide a tire carcass for use with the removable tread belt.

The removable tread belt to be described is adaptable for use with tire carcasses of any construction; bias, bias-belted, or radial. The tire carcass can be of open or closed design. The tire carcass can also be of virtually any aspect ratio, up to a maximum of 0.70. However, the aspect ratio preferably is between 0.40 and 0.55. The term aspect ratio means the ratio of radial height of the tire carcass to the maximum width, the radial height being measured from a tangent to the radially innermost surface of the smallest diameter bead cores to a tangent to the radially outermost point on the carcass plies, the width being measured between opposite points of the cord reinforcing structure that extends from bead to bead.

The orientation of all elements in the following description is referenced to the axis about which the tire rotates.

The removable tread belt of this invention comprises a plurality of axially oriented plates or bars which are encapsulated in a rubber matrix along with an inextensible annular belt disposed adjacent to the bars. The bars are spaced apart a distance no greater than their circumferential width. The bars can extend axially outwardly to a point beyond the carcass sidewall on at least one side of the tire, when the carcass sidewall is loaded and flexed outwardly in its operating condition. The tread belt matrix is equipped on its inner surface with a pattern of raised and lowered portions, such as annular lands and grooves, that interlock with a complementary pattern on the outer surface of the tire carcass to prevent axial movement of the tread belt with respect to the tire carcass. Circumferential movement can be prevented in like manner also, if need be. The radially outer surface of the tread belt matrix has a ground engaging tread.

The tire carcass of this invention has a pattern on its radially outer surface, as explained above, to interlock with the tread belt. This outer surface is bounded by two carcass shoulders. The axial distance between the two shoulders is less than the axial dimension of the tread belt, and it is also less than the distance between the outer surfaces of the carcass sidewalls. The axial bars are of metal or other strong, rigid heat conducting material. They are preferably totally encased by the rubber belt matrix, to prevent corrosion.

The circumferential wire belt is laid around the tire radially outwardly of the bars. The wire belt is substantially non-expansible. The inflated tire carcass presses outwardly against the removable tread belt, to interlock the two, as well as to stabilize and anchor the bars. All of the known additional virtues of such an inextensible belt are also thus present in the tire.

The advantages of the invention are several. The axial bars stiffen the belt so that the ground engaging tread has maximum contact with the ground. This provides improved traction. The axial bars also allow the removable tread to be axially wider than the surface of the tire carcass upon which it is mounted. This means that the ground engaging tread can be wider for a given tire carcass. It also serves to support the axially outer portions of the removable tread without the need for supporting tire carcass structure, which eliminates a large amount of rubber mass at the shoulder portion of the tire carcass, thus reducing weight, cost and heat build-up in the tire. The bars also conduct heat from the center of the tread belt toward the outer edges. The removable tread can also be extended axially outwardly to a point beyond the widest part of the tire carcass sidewalls. The belt, and particularly the axial bars, then protect the tire carcass from damage by rocks and the like. This can be done on one or both sides of the tire. Such protection is especially important in the case of radial tires, which generally have a more flexible sidewall that deflects outwardly to a great extent. Also, the presence of the metal bars is a barrier to penetration of the belt and the tire carcass by sharp objects.

DESCRIPTION OF THE PREFERRED EMBODIMENT

Figure 1:
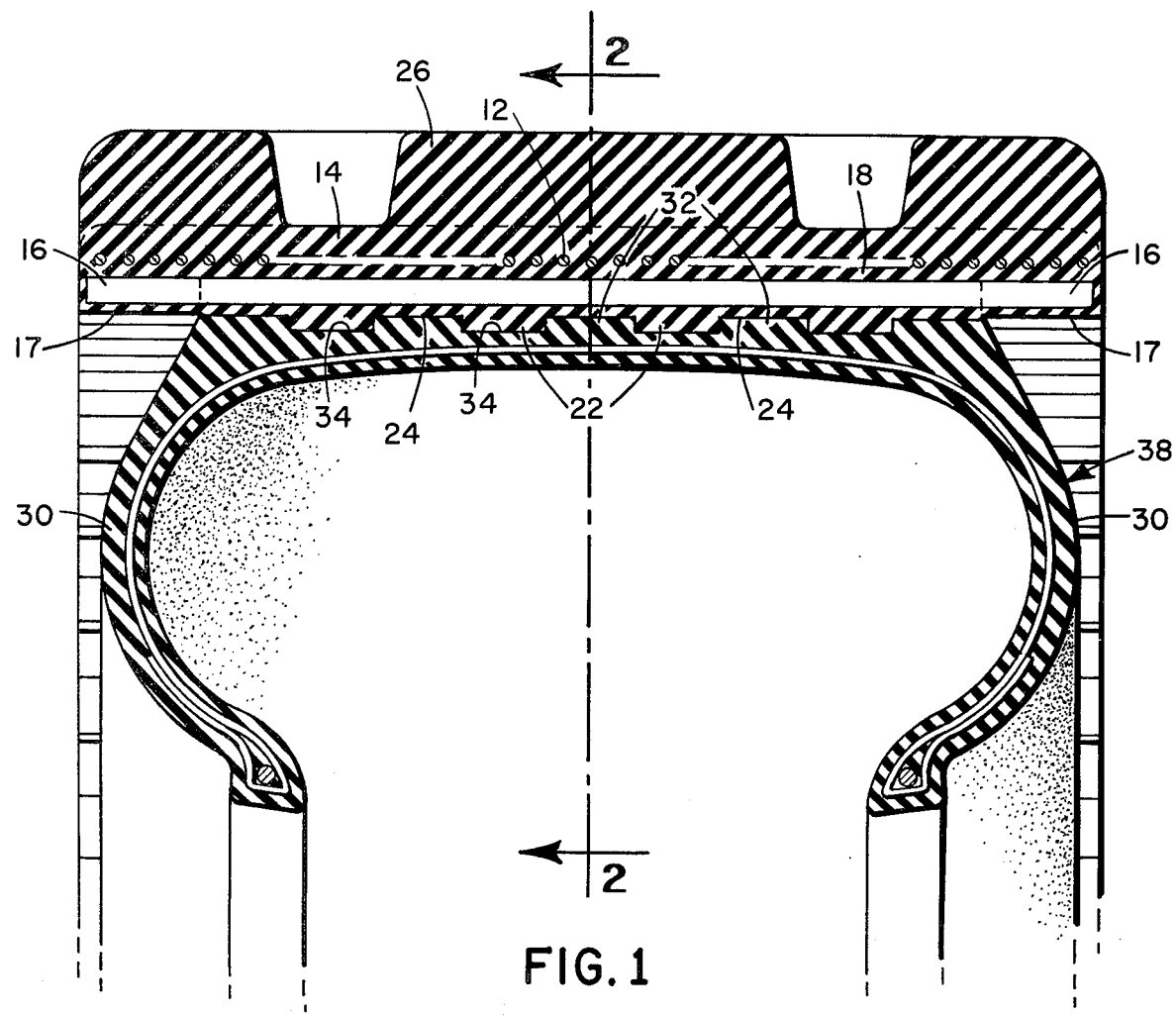
FIG. 1 is a cross-sectional view of a tire carcass and replaceable belt tread constructed in accordance with the teachings of this invention.
Figure 2:
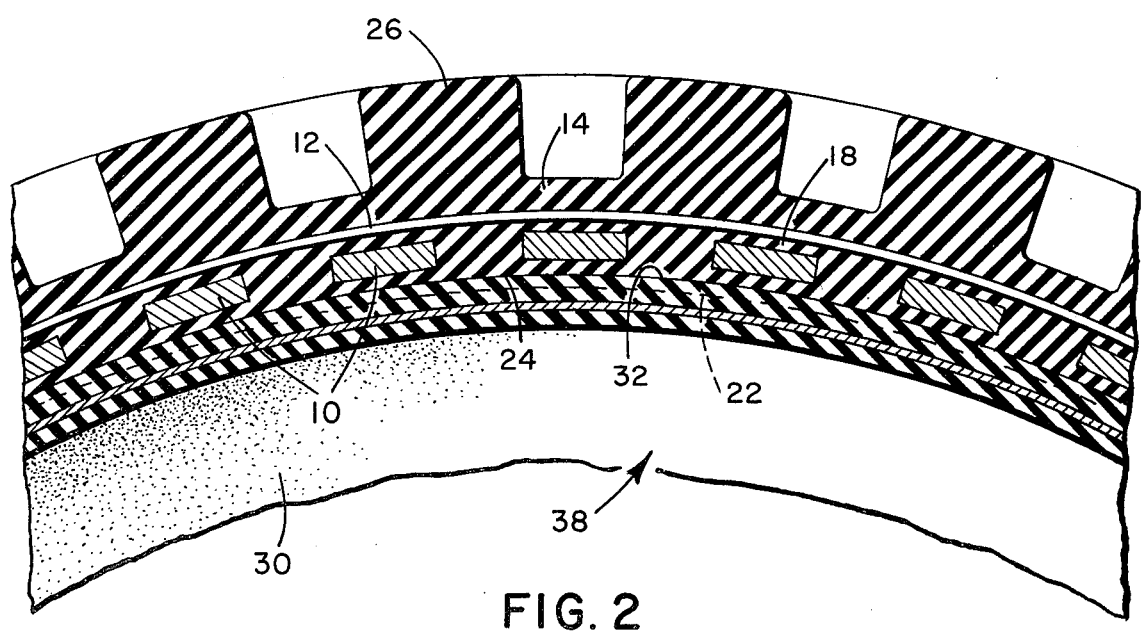
FIG. 2 is a sectional view of the construction of FIG. 1 taken along line 2—2 of FIG. 1.
Figure 3:
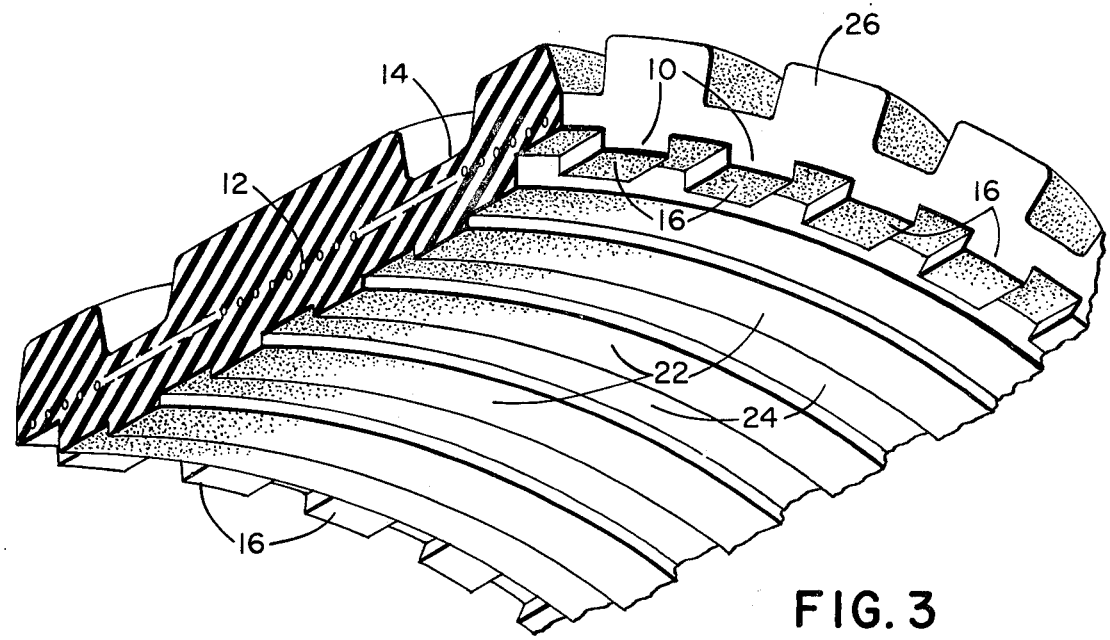
FIG. 3 is a bottom perspective view of a portion of the replaceable belt tread of FIGS. 1 and 2.

The removable tread belt shown in all of the figures comprises a plurality of axially oriented metal bars or plates 10 spaced apart at intervals around the entire belt. Each bar is of quadratic shape, having rectangular cross-sections in length and width. The longer cross-sectional dimension is oriented circumferentially of the tread belt. The cross-sectional axis of each bar is perpendicular to a radius of the tire. In a typical installation, bars 10 are each one-half inch thick and two inches wide, and are spaced apart one and six-tenths inches circumferentially. Too much separation between adjacent bars will diminish their effectiveness, while too little separation might cause the rubber to separate when that portion of the tire contacts the ground.

Spaced slightly radially outside of the plurality of bars 10 is an inextensible wire belt 12 comprised of helically wound wire. The wires of the belt are of substantially zero degree orientation with regard to a circumferential axis and are advantageously so spaced apart axially as to present in cross-section about five ends per inch.

Both bars 10 and wire belt 12 are encapsulated in a rubber belt matrix 14. End portions 16 of each plate 10 can protrude from the major portion of the belt matrix, but in such case are covered at least with a thin film of rubber 17 to protect them from becoming corroded. Matrix 14 is of substantially the same axial width as bars 10, to maximize the tread width, but can be narrower. A layer 18 of belt matrix 14 separates bars 10 and wires 12.

The inner surface of matrix 14 is provided with an alignment pattern comprising a plurality of circumferentially extending lands 22 and grooves 24. The outer surface of matrix 14 has a ground contacting tread pattern 26 which can be of any desirable design and depth.

Figure 4:
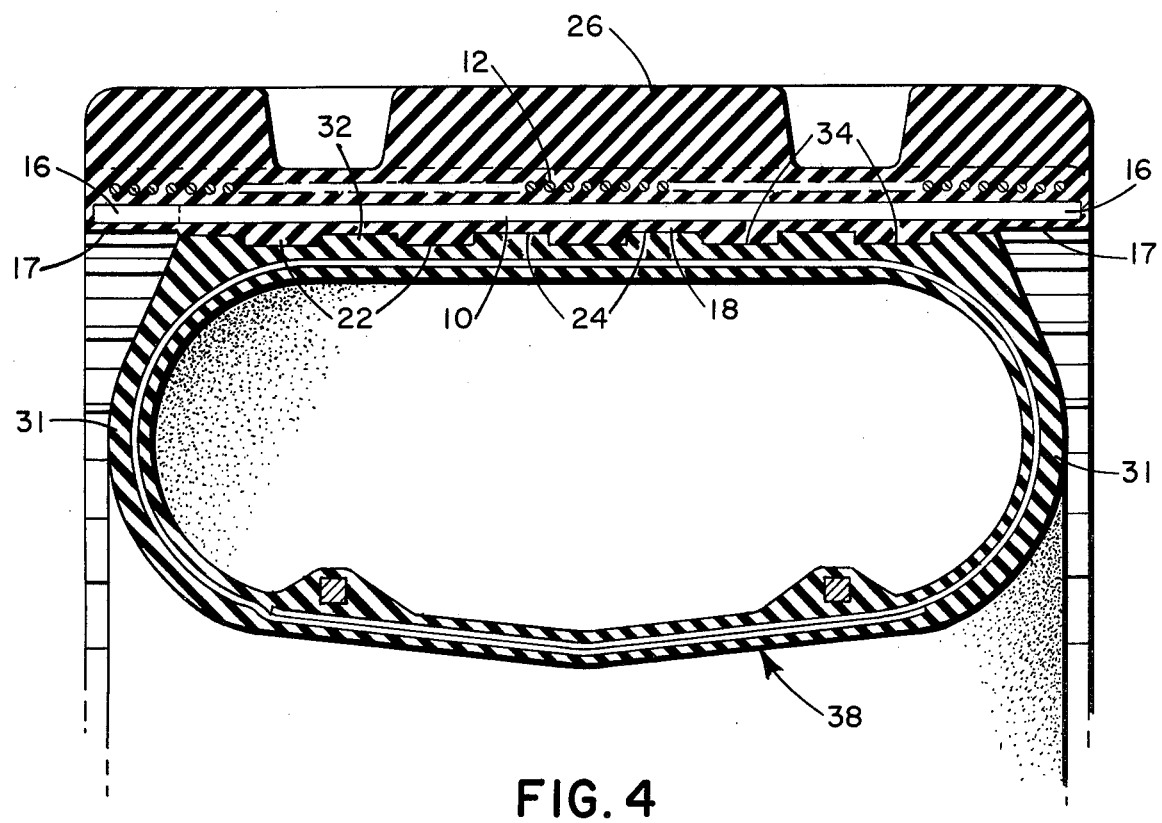
FIG. 4 is a cross-sectional view of the replaceable belt tread installed upon a tire carcass of closed construction.

Tire carcass 30 can be of any suitable structure and design. Illustrated is a tire carcass having an aspect ratio of about forty percent. Tire carcass 30 can be of the open type, as shown in FIG. 1, or the closed type, as shown in FIG. 4. In both situations, the tire carcass 30 (31 in FIG. 4) has on its outer surface a plurality of lands 32 and grooves 34 that interlock with belt lands 22 and grooves 24. While circumferential lands and grooves are shown, variations to this can be made, so long as the replaceable tread belt is held against axial movement with respect to the carcass. While simple carcass constructions are shown, more complex ones could be used.

The removable tread belt can extend axially outwardly beyond the outer extremeties of tire carcass sidewalls 38. This protects sidewalls 28 from damage. While the tread belt has been shown as extending outwardly beyond the sidewalls on both sides of the tire, such can be done on one side only, if desired, or if required by restricted clearance between tire and vehicle.

The outer shoulders 40 of the tire carcass 30 do not extend axially outwardly to the same extent as the removable tread belt. Such is not necessary, for the rigid bars 16 provide the necessary support for the tread belt. As can be seen in FIGS. 1 and 4, this construction requires a considerably lesser mass of rubber in the tire carcass shoulder area than would be required if the shoulder were extended outwardly fully beneath the removable belt. Such elimination of rubber mass reduces heat build-up in the tire carcass, as well as reducing tire weight and cost.

The removable tread belt is installed around a deflated tire carcass. The lands and grooves are aligned, and the carcass is inflated. The radially outwardly expansion of the tire carcass is resisted by the inextensible wire belt, to lock the replaceable belt tread to the tire carcass.

While modifications and variations from the above described preferred embodiments may now become evident to one skilled in the art, it should be understood that the scope of the invention is defined only by the breadth of the appended claims. 9n

I claim:

1. A removable tread belt for installing about the circumferential outer surface of a tire carcass, said removable tread belt comprising:
   an annular belt matrix having a ground contacting tread portion on the outer surface thereof,
   a plurality of rigid bars installed in said belt matrix at spaced intervals around the circumference thereof, said bars extending across substantially the entire axial width of said belt matrix and being spaced radially inwardly of said tread portion, and
   interlocking means on the inner surface of said belt matrix for engaging complementary interlocking means carried by said tire carcass.

2. The removable tread belt of claim 1 wherein said bars are oriented in the direction of the axis of rotation of the tire carcass.

3. The removable tread belt of claim 2 wherein said bars are elongated circumferentially in cross-section, with the cross-sectional axis of each said bar perpendicular to a radius of the tire.

4. The removable tread belt of claim 3 wherein each said bar is of quadratic shape.

5. The removable tread belt of claim 1 wherein said bars are spaced apart circumferentially a distance of from 75 percent to 125 percent of the circumferential dimension of said bar.

6. The removable tread belt of claim 1 wherein said bars have an axial dimension at least equal to that of the outer circumferential surface of the tire carcass with which said removable tread belt is to be used.

7. The removable tread belt of claim 6 wherein said bars extend axially outwardly beyond the outermost point of at least one sidewall of the tire carcass.

8. The removable tread belt of claim 1 wherein said bars are completely covered by said belt matrix.

9. The removable tread belt of claim 1 further comprising an inextensible annular belt installed in said belt matrix and located radially outwardly of said bars.

10. The removable tread belt of claim 9 wherein said inextensible annular belt comprises circumferential wires oriented substantially perpendicular to said bars.

11. The removable tread belt of claim 1 wherein said bars are of heat conducting material.

12. The removable tread belt of claim 1 wherein said interlocking means comprises a plurality of lands and grooves so oriented as to prevent axial movement of said removable tread belt with respect to the outer circumferential surface of the tire carcass.

13. In combination with the removable tread belt of claim 1, a tire carcass comprising an outer circumferential surface having an axial dimension no greater than that of said bars.

14. The combination of claim 12 wherein said tire carcass further comprises a complementary interlocking means on said outer circumferential carcass surface engageable with said interlocking means of said inner surface of said removable tread belt.

15. The combination of claim 13 wherein said carcass has an aspect ratio of not greater than 0.70.

16. The combination of claim 15 wherein said aspect ratio is in the range of 0.04 to 0.55.

17. The combination of claim 13 wherein said carcass is radial ply construction.

* * * * *